United States Patent [19]

Burgdorf et al.

[11] Patent Number: 4,919,496

[45] Date of Patent: Apr. 24, 1990

[54] PROCESS OF MONITORING AND CONTROLLING AN ANTI-LOCKING AUTOMOTIVE BRAKE SYSTEM FOR CARRYING OUT THE SAID PROCESS

[75] Inventors: Jochen Burgdorf, Offenbach-Rumpenheim; Lutz Weise, Mainz, both of Fed. Rep. of Germany

[73] Assignee: Alfred Teves GmbH, Frankfurt Am Main, Fed. Rep. of Germany

[21] Appl. No.: 248,508

[22] Filed: Sep. 23, 1988

[30] Foreign Application Priority Data

Sep. 24, 1987 [DE] Fed. Rep. of Germany ....... 3732162

[51] Int. Cl.[5] .......................... B60T 8/44; B60T 13/16

[52] U.S. Cl. ...................................... 303/114; 303/10; 303/100; 303/116; 60/535; 60/545

[58] Field of Search .................... 303/10, 11, 9.61, 50, 303/61, 62, 63, 92, 100, 103, 113, 114, 116; 188/181 A, 181 C, 356, 359; 60/535, 545, 547.1, 552, 553, 582, 584

[56] References Cited

U.S. PATENT DOCUMENTS

| | | | |
|---|---|---|---|
| 3,412,556 | 11/1968 | Rike et al. | 60/535 |
| 4,478,461 | 10/1984 | Leiber | 303/92 |
| 4,526,003 | 7/1985 | Leiber | 60/545 X |
| 4,580,847 | 4/1986 | Burgdorf | 303/114 |
| 4,629,258 | 12/1986 | Resch et al. | 303/114 X |
| 4,653,813 | 3/1987 | Burgdorf | 303/114 X |
| 4,767,165 | 8/1988 | Burgdorf | 303/114 X |
| 4,783,125 | 11/1988 | Belart et al. | 303/92 |
| 4,790,608 | 12/1988 | Burgdorf et al. | 303/114 |
| 4,826,255 | 5/1989 | Volz | 303/10 |

FOREIGN PATENT DOCUMENTS

| | | | |
|---|---|---|---|
| 3210735 | 6/1983 | Fed. Rep. of Germany . | |
| 3418044 | 4/1986 | Fed. Rep. of Germany . | |
| 3538330 | 4/1987 | Fed. Rep. of Germany . | |
| 3607366 | 9/1987 | Fed. Rep. of Germany . | |
| 3627000 | 2/1988 | Fed. Rep. of Germany . | |
| 2169975 | 1/1985 | United Kingdom . | |
| 2170287 | 1/1985 | United Kingdom . | |
| 2187522 | 9/1987 | United Kingdom | 303/114 |

*Primary Examiner*—Andres Kashnikow
*Assistant Examiner*—Timothy Newholm
*Attorney, Agent, or Firm*—Robert P. Seitter

[57] ABSTRACT

A process and apparatus for monitoring and controlling an anti-locking automotive brake system comprising a tandem master cylinder and an auxiliary pressure source, from which, in the event of anti-lock regulation, pressure fluid is supplied to the working chambers of the master cylinder. Auxiliary pressure regulation is performed with the aid of central valves and the auxiliary pressure source is turned on and off in response to the advance of the primary piston, a maximum distance being preset between the primary and the secondary piston. Once this space is exceeded, the central valve disposed in the primary piston, opens resulting in another advance of the primary piston and a switch-on of the auxiliary pressure source. If the primary piston after the auxiliary pressure source having been turned on, is not restored within the predetermined time interval, an error signal will be generated. If the way switch disposed on the primary piston fails to respond after a predetermined number of regulating cycles or pressure-decreasing pulses, an error signal will also be generated and the anti-locking regulation will be turned off or the auxiliary pressure source switched on.

16 Claims, 1 Drawing Sheet

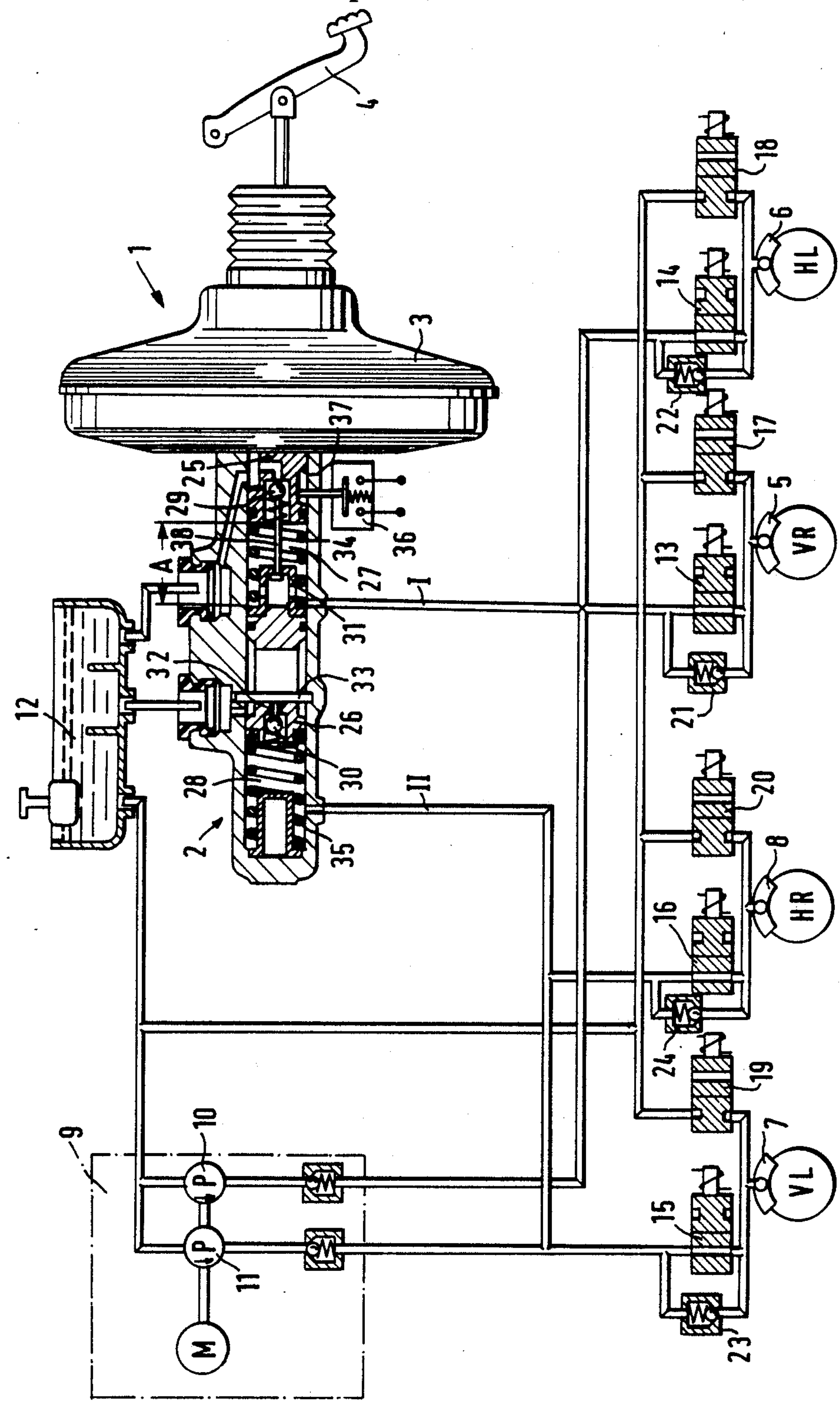

PROCESS OF MONITORING AND CONTROLLING AN ANTI-LOCKING AUTOMOTIVE BRAKE SYSTEM FOR CARRYING OUT THE SAID PROCESS

BACKGROUND OF THE INVENTION

1. Field of the Invention

The present invention is concerned with a process for monitoring and controlling an anti-locking brake system.

2. Description of the Relevant Art

Art relevant to the above field of invention is described in German printed Patent Application P No. 36 27 000. Connected to the two brake circuits of the tandem master cylinder, through hydraulically separated circuits, is respectively one hydraulic pump. The two pumps have a common driving motor which is turned on once a locking tendency is detected and the anti-lock control commences. To confine the auxiliary pressure to a value proportional to the foot or pedal force, central regulating valves are provided in the primary and in the secondary pistons. Due to the pressure fluid supplied by the pumps, the pistons are first restored to their resting or initial position where the regulating valves are opened with the aid of a stop and a plunger to such a degree that a pressure value, in proportion to the pedal force, adjusts itself in the working chambers. The wheel brakes, through multi-way valves, are in communication with the two brake circuits. For decreasing the pressure at the wheel brake, an inlet valve is closed while an outlet valve, which admits pressure fluid effluent to the pressure medium reservoir, is opened. The hydraulic pumps insure that the pressure fluid effluent admitted to the reservoir is compensated for in the system. The disadvantages involved with a brake system of this type reside in that, once the hydraulic pumps are turned on, the pistons and, hence, the brake pedal most abruptly are restored to the initial position.

Also, it has previously been suggested to monitor the advance of the pistons in the master cylinder of an anti-locking brake system with the aid of a way-switch which supplies an electric signal to turn on an auxiliary pressure source once the piston has covered a predetermined distance (German printed Patent Application P No. 36 19 487). It was intended to thereby insure the presence of an adequate reserve volume of fluid pressure in the working chambers of the master cylinder.

Equally known are anti-locking brake systems provided with way-switches signaling the piston advance and performing regulating and monitoring functions.

SUMMARY OF THE INVENTION

It is an object of the invention to provide a process of monitoring and controlling an anti-locking automotive brake system of the type comprising a brake pressure generator having a tandem master cylinder and an auxiliary pressure source from which, in the event of anti-lock control, pressure fluid is fed into the working chambers of the master cylinder with the aid of central valves which discharge excess pressure fluid from the working chambers into a pressure reservoir, being regulated to a value in proportion to the pedal force. A brake system, enabling a process of the aforedescribed type to be carried out, comprises wheel valves for regulating the brake pressure in the wheel brakes and, in addition, electronic circuits for logically operating and processing measured variables and for generating signals enabling the valves and the auxiliary pressure source to be controlled. The control process substantially enhances the operating safety of the brake system and, in addition, by correspondingly positioning the pistons of the master cylinder, conveys a pleasant pedal feeling. Additionally, the reliable signalization of errors of different types is provided.

This object can be solved by a brake system of the aforedescribed type in which the auxiliary pressure source is turned on and off in response to the advance of the primary and intermediate pistons, respectively, and in which a maximum distance is provided between the primary and the intermediate pistons, the exceeding of which results in opening of the central valve connecting the primary brake circuit and the primary working chamber respectively, in the master cylinder, to the pressure medium reservoir, thereby advancing the primary piston and turning on the auxiliary pressure source.

To carry out the process, in the practice of the invention, a way-switch is located on the primary piston directly, on the pedal mount of the piston, or on a booster ahead thereof, with the way-switch generating an electric signal which is dependent on the advance, and on the position, of the primary piston, respectively. The signal operates to turn on and off the auxiliary pressure source. The maximum distance between the two pistons is preset by mechanically coupling the central valve contained in the primary piston to the secondary piston. Once the maximum distance is reached or exceeded, the coupled central valve opens, thereby virtually causing the primary piston to advance in the direction of pedal actuation.

Hence, in the practice of the invention, the brake pedal is positioned by turning on and off the auxiliary pressure source with the aid of the switch located on the primary piston. By monitoring the space between the two pistons and by coupling the central valve of the primary piston to the secondary piston, respectively, emptying of the secondary working chamber is reliably precluded.

Due to the way-switch and the coupling of the secondary piston to the central valve of the primary piston, the repercussions on the position of the primary piston and on the switch position of differing types, as explained in closer detail hereinafter, will be detected and the effect thereof on the function of the brake system substantially reduced.

According to an advantageous embodiment of the process according to the invention, critria for the switch-on mode of the auxiliary pressure source and/or for the release of an error signal are derived from the advance, and from the axial position of the primary piston, respectively, under consideration of the deceleration of the automotive vehicle and the number of regulating cycles after commencement of the regulation and/or the number and duration of the brake pressure decreasing pulses and other measured variables, if any. For example, it is recognized that after a predetermined number of regulating cycles or pressure decreasing pulses, the primary piston must have reached the warning switch. If the deceleration of the automotive vehicle is low, this will occur only after a relatively high number of cycles or pulses. In case of a high deceleration of the automotive vehicle, the switch is reached rapidly. If the switch fails to respond, after the recognized number of pulses, the reason may, for example, be a defective way-switch.

Advantageously, the auxiliary pressure source is turned on once the primary piston has reached a predetermined position. After restoring of the primary piston, the auxiliary pressure source is switched off. A hysteresis characteristic, due to timers or the like, between turning on and off, precludes an unstable switching position by permanent re-switching. Such an instability would be unfavorable to the life of the contacts, of the motor, and of the pump.

The advance of the primary piston, according to an embodiment of the process of the invention, is compared with the number of regulating cycles after commencement of the anti-locking regulation and/or the number and duration of the pressure decreasing pulses to release an error signal whenever a nominal value of the advance, after a predetermined number of cycles or pulses in response to the automotive deceleration, is not reached.

Feasibly, the time interval between turning on the auxiliary pressure source and the return stroke and restoring, respectively, of the primary piston is determined and an error signal is released once the time interval exceeds a maximum value, adjusted to account for the level of the automotive deceleration and the number of cycles or pulses. Once the permitted time interval, within which the primary piston with an intact system should have reached its initial position is exceeded, a defective condition can be assumed. In such a case, it is advisable to turn off the anti-locking regulation. In the event of a failure of a brake circuit, for example, in a dual-circuit brake system, turning off the anti-locking regulation is unlikely to jeopardize the driving stability and the steering capability of the automotive vehicle because the non-decelerated wheels insure a high lateral control.

In another embodiment of the invention, the auxiliary pressure source comprises two hydraulic pumps which, through hydraulically separated circuits, are respectively in communication with a brake circuit and are actuated by a common driving motor. This embodiment is inexpensive to produce. By coupling the two pistons through the central valve of the primary piston and due to the described repercussion on the position of the primary piston and, hence, on the switching position of the way-switch, it is insured that the driving motor continues to be switched on if, for example, during anti-locking control, pressure fluid is discharged only from the secondary circuit. Errors in the secondary circuit thereby result if the maximum switch-over time of the way-switch is exceeded, thereby generating an error signal.

Further features, advantages and fields of end-use application of the invention will be apparent by reference to the following specification and to the drawings.

BRIEF DESCRIPTION OF THE DRAWINGS

The FIGURE is a schematic view of a brake system embodying the present invention.

DETAILED DESCRIPTION OF THE PREFERRED EMBODIMENT

The brake system as shown in the drawing, includes a brake pressure generator 1 substantially comprising a tandem master cylinder 2, connected to brake circuits I and II, a vacuum brake force booster 3, and a brake pedal 4.

Diagonally connected to the two brake circuits I, II, are the wheels of the automotive vehicle. The brake circuit I leads to wheel brakes 5, 6 of the right-hand front wheel VR and of the left-hand rear wheel HL, respectively, while brake circuit II leads to the wheel brakes 7, 8 of the left-hand front wheel VL and of the right-hand rear wheel HR, respectively.

An auxiliary pressure source 9 is provided which comprises two hydraulic pumps 10, 11, connected through hydraulically separated circuits to brake circuits I and II, respectively. Both hydraulic pumps 10, 11 are actuated by a common electro-motor M. A common pressure medium reservoir 12, comprising a plurality of chambers, is provided for the brake pressure generator 1, the tandem master cylinder 2, and the auxiliary pressure source 9.

Connected to the brake circuits I, II and, hence, to the brake pressure generator 1 and the auxiliary pressure source 9, are wheel brakes 5, 6, 7 and 8. The brakes are connected through wheel valves 13, 14, 15 and 16. The wheel valves 13, 14, 15, 16 comprise 2-way/2-position valves which, in their normal position are switched to passage. Also connected to wheel brakes 5, 6, 7, 8 are outlet valves 17, 18, 19 and 20 which, in their normal position, are closed. Pressure fluid can be fed from the wheel brakes 5, 6, 7 and 8 through outlet valves 17, 18, 19, 20 to the pressure medium reservoir 12. Disposed in parallel to each inlet valve 13, 14, 15 and 16 is a check valve 21, 22, 23 and 24, respectively. The check valves 21, 22, 23, 24 insure that during release of the brake, a closure of the pressure fluid from the wheel brakes to the master cylinder 2 occurs.

The tandem master cylinder 2 contains a primary piston 25 and a secondary piston 26 (the terminology "push rods" (25) and "intermediate piston" or "floating piston" (26), are equally customary). Brake pressure is built up upon displacement of pistons 25, 26, in working chambers 27, and 28 which are connected to the brake circuits I, II and, the wheel brakes 5, 6 and 7, 8, respectively.

The working chambers 27, 28 communicate with pressure medium reservoir 12 through central valves 29, 30 and through channels formed in the interior of the pistons. In the present embodiment, the central valves 29, 30 are in the form of control valves. With the brakes not applied, the central valves 29, 30 are in an open position. In the primary piston circuit I, the open position is attained by anchoring the central valve 29, with the aid of a sleeve 31, to the secondary piston 26 and, in the secondary piston circuit II with the aid of an axial plunger 32 contained in the radial stop bolt 33. Restoring spring 34, 35 hold the pistons, with the brake not applied, in their resting position as shown in the drawing.

A way-switch 36 is provided having an actuator which contacts primary piston 25. During advancing of piston 25, the way-switch 36 is actuated by an oblique ramp 37 which contacts the actuator resulting in the closing of the symbolically shown electric connection and, hence, in the generation of a signal. During restoring of the piston 26 to its original, non-brake position, switch 36 is reopened.

By mechanically coupling the central valve 29 to the secondary piston 26, a space A is confined to a maximum value as described in greater detail below. During braking, a smaller space is permitted because the bolt 38, by which the closing ball of the valve 29 is coupled to the sleeve 31, is axially displaceable within the said sleeve.

A brake system of the aforedescribed type, moreover, includes electronic circuits (not shown) logically operating and processing electric signals mirroring the rotational pattern of the individual wheels and the circuit position of the switch 36. The circuit generates appropriate signals for controlling the wheel valves 13, 14, 15, 16, 17, 18, 19 and 20 and the driving motor M of the auxiliary pressure source 9.

Operation of the brake system described above is as follows. Upon brake actuation, the central valves 29, 30 are closed to allow brake pressure to develop in the working chambers 27, 28 and, hence, in the brake circuits I, II. Wheel valves 13, 14, 15, 16, 17, 18, 19 and 20 remain in the positions shown until instability occurs and until one or more whe]s show a locking tendency, thereby starting the anti-locking control. As is well known, during the regulating cycles, pressurized fluid is fed through the outlet valves 17, 18, 19 and 20, opened, through pressure decreasing pulses, to the pressure medium reservoir 12. After a short period of time, or after only a few regulating cycles, the oblique ramp 37 of the primary piston 25 reaches the actuating pin of the switch 36 thereby turning on the auxiliary pressure source 9 and the driving motor M of the two hydraulic pumps 10, 11, respectively.

Following actuation of pumps 10 and 11, pressurized fluid flows through the pumps and into the working chambers 27, 28 to restore pistons 25, 26. The regulating valve 29 is opened once the space A between the two pistons has reached its maximum value, an the valve 30, after having reached the stop, is opened by plunger 32. As a result, the controlled auxiliary pressure is regulated to a value which is proportional to the pedal force.

After restoring the primary piston 25 and releasing switch 36, the driving motor M of the auxiliary pressure source 9 is switched off. Through the use of timers, electronic circuitry, or by a corresponding mechanical configuration of the switch, an adequate circuiting hysteresis is insured to preclude vibrations or excessive switching on and off of the motor M, and to avoid overload of the contacts.

If, after a predetermined number of regulating cycles or pressure decreasing pulses, the switch 36 is not actuated and no signal indicative of the switch actuation occurs, there must be a defective condition. For example, switch 36 could be defective. In such a case, either the anti-locking control is turned off and/or the auxiliary pressure source 9 is turned on to maintain the brake function at least to a limited extent.

Another possible defective condition of the brake system is identifiable in that after actuation of switch 36 and the auxiliary pressure source 9, there is an excessively long period of time before restoration of the primary piston 25; as signaled by switch 36. Also in such a case, the error must operate to turn off, if need be, the regulation of the system.

In case of an error in the secondary brake circuit II resulting in an excessively low pressure or in an excessively low amount of pressure fluid in the brake circuit II and in the working chamber 28, the space A between the pistons 25 and 26 reaches its maximum value causing the control valve 29 to open and the primary piston 25 to advance in the brake actuating direction, actuating switch 36. The switch 36 will remain closed even after the auxiliary pressure source 9 is turned on because the primary piston cannot be restored. Preferably, the anti-locking control should be turned off after a predetermined maximum time has lapsed. This condition is relatively uncritical as the wheels, in the defective secondary circuit II, do not lock therefore insuring at least a restricted driving stability and steering capability.

It has proven advantageous to vary the number of regulating cycles or pressure decreasing pulses by which switch 36 must respond during the automotive deceleration. In a 10% automotive deceleration, for example, four regulating cycles or a corresponding number of pressure decreasing pulses could be required before advancing primary piston 25 reaches the way-switch 36, while in a 20% deceleration (relative to the well-known maximum vehicular deceleration of approximately 1 g attainable under ideal conditions), two regulating cycles should be required and in a 40% or more deceleration (relative to the well-known maximum vehicular deceleration of approximately 1 g attainable under ideal conditions), the way-switch 36 should be reached in the first regulating cycle. Varied preset values permit rapid identification and signalization of a defective condition, and dangerous situations can be avoided by quickly responding to error events and by an immediate switch-off of the anti-locking regulation, respectively.

Finally, an automatic recalibration can be attained in systems of the aforedescribed type by measuring the automotive deceleration in normal braking processes, identifying the point of response of the switch 36 and comparing with nominal values. By these measured variables, the number of regulating cycles or pressure decreasing pulses by which the way-switch must respond, is fixed in response to the automotive deceleration.

By the process of the invention, the corresponding brake system, the hydraulic pumps, the driving motor, the switch and all related electrical and hydraulic components are monitored permanently or, in any case, in short intervals. The forward movement of the primary piston 25 beyond the limit preset by the ramp 37 causes energization of the auxiliary pressure source 9 by means of switch 36. This entails pressure medium supply to the working chambers 27, 28, re-movement of the pistons to the right, re-opening of switch 36 and de-activation of pump 10. Thus, repeated switching on and off, and the intervals between the switch actuations with regard to the skid signals or anti-skid control signals, respectively, can be evaluated to monitor proper functioning of the system or to identify early, certain defects of the brake system. By logically operating the measured variables and checking under plausibility criteria of the type described or otherwise, fast and reliable detection of an error is permitted. The positioning of the pedal with the aid of the switch avoids major restoring paths during operation of the hydraulic pump, which is deemed to cause a pleasant feeling on the part of the driver.

What is claimed is:

1. A process of monitoring and controlling an anti-lock automotive brake system having a brake pressure generator comprising a tandem master cylinder, with a primary and an intermediate piston disposed in working chambers therein, and an auxiliary pressure source operable during anti-lock regulation to supply a pressure medium to said working chambers of said master cylinder, to restore said primary piston, said auxiliary source operable through a central valve in said master cylinder to discharge excess pressure medium from said working chambers through said central valve to a pressure medium reservoir in proportion to a pedal force, comprising the steps of:

turning said auxiliary pressure source on and off in response to the postion of said primary piston disposed within said tandem master cylinder;

determining the maximum distance between said primary and said intermediate pistons wherein said maximum distance is determined when a bolt, which is axially displaceable within a sleeve of said intermediate piston, is positioned outside of said sleeve to an extent necessary to allow said central valve to open; and opening said central valve, upon exceeding said maximum distance, to connect said working chamber, and its associated brake circuit, to said pressure medium thereby advancing said primary piston and thereby turning on said auxiliary pressure source.

2. The process defined in claim 1 further comprising the steps of:

monitoring the criteria of the advance of said primary piston in said working chamber, the rate of automotive deceleration, a given number of regulating cycles after commencement of anti-lock regulation and a given number and duration of brake pressure decreasing pulses;

turning on said auxiliary pressure source in response to predetermined values of said criteria; and generating an error signal in response to predetermined values of said criteria.

3. The process defined in claim 1, further comprising the step of:

turning on said auxiliary pressure source when said primary piston reaches a predetermined position.

4. The process defined in claim 1 further comprising the steps of:

comparing the advance of said primary piston with a sensed number of regulating cycles as of commencement of anti-lock regulation;

releasing an error signal once a nominal value of the primary piston advance, after a predetermined number of regulating decreasing pulses has not been reached.

5. The process defined in claim 4 further comprising the step of:

varying said preset nominal value and said predetermined number of regulating cycles in response to the rate of automotive deceleration.

6. The process defined in claim 5 further comprising the step of:

increasing said predetermined number of regulating cycles in proportion to the rate of automotive deceleration.

7. The process defined in claim 6 further comprising the step of:

increasing said predetermined number of pressure decreasing pulses in proportion to the rate of automotive deceleration.

8. The process defined in claim 1 further comprising the step of:

comparing the advance of said primary piston with a sensed number and duration of pressure decreasing pulses as of commencement of anti-lock regulation;

releasing an error signal once a nominal value of the primary piston advance, after a predetermined number of pressure decreasing pulses has not been reached.

9. The process defined in claim 8 further comprising the step of:

varying said preset nominal value and said predetermined number of pressure decreasing pulses in response to the rate of automotive deceleration.

10. A process of monitoring and controlling an anti-lock automotive brake system having a brake pressure generator comprising a tandem master cylinder, with a primary and an intermediate piston disposed in working chambers therein, and an auxiliary pressure source operable during anti-lock regulation to supply a pressure medium to said working chambers of said master cylinder, to restore said primary piston, said auxiliary source operable through a central valve in said master cylinder to discharge excess pressure medium from said working chambers through said central valve to a pressure medium reservoir in proportion to a pedal force, comprising the steps of:

turning said auxiliary pressure source on and off in response to the position of said primary piston disposed within said tandem master cylinder;

determining the maximum distance between said primary and said intermediate pistons;

opening said central valve, upon exceeding said maximum distance, to connect said working chamber, and its associated brake circuit, to said pressure medium thereby advancing said primary piston and turning on said auxiliary pressure source; and releasing an error signal once the time interval between turning on said auxiliary pressure source and restoring said primary piston exceeds a predetermined value.

11. The process defined in claim 10 further comprising the step of:

varying said predetermined time interval in response to a rate of automotive deceleration.

12. The process defined in claim 10 further comprising the step of:

varying said predetermined time interval in response to a given number of regulating cycles.

13. The process defined in claim 10 further comprising the step of:

varying said predetermined time interval in response to a given number of pressure decreasing pulses.

14. A process of monitoring and controlling an anti-lock automotive brake system having a brake pressure generator comprising a tandem master cylinder, with a primary and an intermediate piston disposed in working chambers therein, and an auxiliary pressure source operable during anti-lock regulation to supply a pressure medium to said working chambers of said master cylinder, to restore said primary piston, said auxiliary source operable through a central valve in said master cylinder to discharge excess pressure medium from said working chambers through said central valve to a pressure medium reservoir in proportion to a pedal force, comprising the steps of:

turning said auxiliary pressure source on and off in response to the position of said primary piston disposed within said tandem master cylinder;

determining the maximum distance between said primary and said intermediate pistons;

opening said central valve, upon exceeding said maximum distance, to connect said working chamber, and its associated brake circuit, to said pressure medium thereby advancing said primary piston and thereby turning on said auxiliary pressure source;

turning off anti-lock regulation a predetermined time interval between turning on said auxiliary pressure source, restoring said primary piston and signalization of said restoration being exceeded.

15. An automotive brake system having a brake pressure generator comprising a tandem master cylinder, with a primary and intermediate piston disposed in working chambers therein, and an auxiliary pressure source operable during anti-lock regulation to supply a pressure medium to said working chambers of said master cylinder to restore said primary piston, a central valve of a control valve configuration, disposed within said pistons of said master cylinder to connect said working chambers to a pressure medium reservoir thereby controlling the pressure applied to said working chambers by said auxiliary pressure source, wheel valves operable to regulate the brake pressure in the wheel brakes, and electrical circuts for logically operating and processing measured variables and for generating signals to control said wheel valves and said auxiliary pressure source, the improvement of which comprises:

a way-switch located so as to monitor the location of said primary piston and operable to generate an electrical signal in response to the position of said primary piston to cycle said auxiliary pressure source;

a mechanical coupling disposed between said central valve and said intermediate piston to set a maximum space between said primary and said secondary pistons, the exceeding of which will result in an opening of said central valve; and wherein said mechanical coupling consists of a bolt axially displaceable in a sleeve of said intermediate piston, and said maximum space is obtained when said bolt is correspondingly positioned outside of said sleeve.

16. A brake system defined in claim 15, wherein said auxiliary pressure comprises two hydraulic pumps actuated by a common motor which, through hydraulically separate circuits, are each in communication with one working chamber of said tandem master cylinder and respectively, with one brake circuit.

* * * * *